(12) United States Patent
Ho et al.

(10) Patent No.: US 10,065,374 B2
(45) Date of Patent: Sep. 4, 2018

(54) METHOD OF AUTOMATICALLY ADDING SUPPORTING STRUCTURE TO 3D MODEL

(71) Applicants: XYZPRINTING, INC., New Taipei (TW); KINPO ELECTRONICS, INC., New Taipei (TW)

(72) Inventors: Kwan Ho, New Taipei (TW); Bo-Yi Wu, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 261 days.

(21) Appl. No.: 15/091,801

(22) Filed: Apr. 6, 2016

(65) Prior Publication Data
US 2017/0225397 A1 Aug. 10, 2017

(30) Foreign Application Priority Data
Feb. 5, 2016 (CN) .......................... 2016 1 0080907

(51) Int. Cl.
B29C 67/00 (2017.01)
G05B 17/02 (2006.01)
G05B 19/402 (2006.01)
B33Y 50/02 (2015.01)

(52) U.S. Cl.
CPC ...... *B29C 67/0088* (2013.01); *B29C 67/0092* (2013.01); *G05B 17/02* (2013.01); *G05B 19/402* (2013.01); *B33Y 50/02* (2014.12); *G05B 2219/49023* (2013.01)

(58) Field of Classification Search
CPC ............ B29C 67/0088; B29C 67/0092; B29C 67/0074; B33Y 50/02; B33Y 10/00; B33Y 40/00; G05B 17/02; G05B 19/402; G05B 2219/49023
USPC .................................................. 700/117–119
See application file for complete search history.

(56) References Cited

U.S. PATENT DOCUMENTS 9,361,553 B1 * 6/2016 Ito ........................... G06T 19/20
9,747,394 B2 * 8/2017 Nelaturi .............. G06F 17/5009
2017/0203515 A1 * 7/2017 Bennett ............... B29C 67/0088

OTHER PUBLICATIONS

Search Report dated Aug. 7, 2017 of the corresponding European patent application No. 16167693.7.
Samuel Homus et al: Tight printable enclosures for additive , May 4, 2015.

(Continued)

*Primary Examiner* — Chun Cao
(74) *Attorney, Agent, or Firm* — Chun-Ming Shih; HDLS IPR Services

(57) ABSTRACT

A printing slicing method for 3D model for automatically adding a required supporting structure to a 3D model is disclosed. The method includes following steps. Retrieve a minimum overlapping ratio corresponding to a layer height. Execute a slicing process and analyze an overlapping ratio between two molded object slices which form a suspended slope. Add the supporting structure below the corresponding suspended slope when determining that the overlapping ratio is less than the minimum overlap ratio. This disclosed example can effectively prevent the suspended part of a printed 3D model entity from a deformation because of the adhesion area thereon is too small, and can also effectively save the printing time and the usage amount of supplies.

12 Claims, 10 Drawing Sheets

(56) References Cited

OTHER PUBLICATIONS

Jeremie Dumas et al: "Bridging the gap", ACM Transactions on Graphics (TOG), ACM, US, vol. 33, No. 4, Jul. 27, 2014.
Prashant Kulkarni et al: "A review of process planning techniques in layered manufacturing", Rapid Prototyping Journal, vol. 6, No. 1, Mar. 1, 2000.

* cited by examiner

METHOD OF AUTOMATICALLY ADDING SUPPORTING STRUCTURE TO 3D MODEL

BACKGROUND OF THE INVENTION

Technical Field

The technical field relates to a 3D model, and more particular related to a printing slicing method for 3D model.

Description of the Related Art 3D printing techniques is a technique getting the most attention in recent years. Via 3D printing techniques, users can design and draw 3D model by him/herself, and materialize the drawn 3D model with a 3D printer.

Among 3D printing techniques, the most mature and widely used technique is to heat solid supplies to semi-fused state at first, and then squeezes the heated supplies to a particular position on the platform according to the 3D model. Because the room temperature is far below the melting point of the supplies, the supplies squeezed to the platform will rapidly recover to solid state. Repeating the stacking process as so, the 3D model can be materialized.

Please refer simultaneously to FIG. 1 and FIG. 2. FIG. 1 is the schematic of the slope. FIG. 2 is the schematic of the 3D model entity without supporting structure. If the aforementioned 3D model includes slopes (the slope with 15 to 60 degrees as shown on FIG. 1), the squeezed out supplies with semi-fused states cannot be successfully shaped, and forming the failed 3D model entity as shown on FIG. 2.

To solve the above problem, a printing slicing method for 3D model of a related art has been proposed. Please refer to FIG. 3. FIG. 3 is the schematic of the 3D model entity with a supporting structure. The printing slicing method for 3D model of related art can automatically detect the slope of the 3D model, and automatically add in a supporting structure below the slope (as shown in FIG. 3). As such, the printing of squeezed out supplies will not fail due to the insufficient adhesion area thereon.

However, no matter whether the supporting structure is necessary for the slope of the 3D model, such as in this example that the angle of the slope greater than or equal to 45 degrees can also provide sufficient adhesion area without supporting structure, the printing slicing methods for 3D model of related art automatically add in a supporting structure. The above mentioned method not only increases printing time but also increases the usage amount of supplies.

Therefore, the printing slicing method for 3D model of related art has abovementioned problem. More effective ways need to be found.

SUMMARY OF THE INVENTION

The disclosure is directed to a printing slicing method of 3D model for analyzing multiple specific parts that need to add supporting structures, and for automatically adding a required supporting structure to these specific parts on the 3D model.

One of the exemplary embodiments, a printing slicing method for 3D model for adding a supporting structure to a 3D model via calculation is disclosed. The printing slicing method for 3D model includes:

a) retrieving a layer height and a minimum overlapping ratio corresponding to the layer height;

b) executing a slicing process to the 3D model according to the layer height to retrieve a plurality of molded object slices, and analyzing respectively an overlapping ratio between at least two of the molded object slices among the molded object slices adjacent up and down and forming a suspended slope; and c) adding the supporting structure below the corresponding suspended slope when determining that the overlapping ratio is less than the minimum overlapping ratio.

Preferably, the step a) is to divide a height value of the 3D model to a number of slicing to retrieve the layer height, wherein the number of the molded object slices and the number of slicing are the same.

Preferably, a step a1) is included after the step a): retrieving a critical angle corresponding to the minimum overlapping ratio, the layer height and a printing aperture of a 3D printer. A step b1) is included after the step b): retrieving an inclined angle of the suspended slope according to the overlapping ratio. The step c) determines that whether the overlapping ratio is less than the minimum overlapping ratio according to whether the inclined angle is less than the critical angle.

Preferably, the step a1) retrieves the critical angle according to a lookup table, wherein the lookup table records a corresponding relation between the minimum overlapping ratio, a plurality of the layer heights, the printing aperture and the critical angle.

Preferably, the critical angle is $$\cot^{-1}(1-k) * \frac{N}{Lx}, 0 < k < 1,$$

wherein k is the minimum overlapping ratio; N is the printing aperture; Lx is the layer height.

Preferably, the step b1) includes a step b11): calculating the acute angle formed by a connecting line of the central points of the two molded object slices and a horizontal line according to the overlapping ratio, the acute angle acts as the inclined angle.

Preferably, the step c) is to add a plurality of supporting object slices incorporated in the supporting structure to a place below the suspended part of the upper layer of the molded object slice.

Preferably, the minimum overlapping ratio is 1/2.

Preferably, it further includes the following steps:

d) transforming the plurality of molded object slices into a first printing data according to a printing aperture of a 3D printer, and transforming the plurality of supporting object slices incorporated in the supporting structure into a second printing data; and e) transferring the first printing data and the second printing data to the 3D printer to proceed printing.

Preferably, the step e) is, according to the first printing data, controlling a first nozzle of the 3D printer to use a first material supply to proceed printing, and according to the second printing data, controlling a second nozzle of the 3D printer to use a second material supply to proceed printing.

Preferably, it further includes a step f): proceeding a simplified step to the added supporting structures adjacent to each other.

Preferably, the simplified step is to combine the supporting structures adjacent to each other into a shared supporting structure, wherein the sum of the overlapping ratio between the shared supporting structure and the supported molded object slice and the overlapping ratio between the supported molded object slice and other molded object slices is not less than the minimum overlapping ratio.

The printing slicing method for 3D model entity of this disclosed example can effectively prevent the suspended part of a printed 3D model entity from a deformation because of the adhesion area thereon is too small, and can also avoid setting supporting structures on parts for which the supporting structures are not necessary, so as to effectively save the printing time and the usage amount of supplies.

DETAILED DESCRIPTION OF THE INVENTION

A preferred embodiment with drawings is illustrated in details as follows.

Figure 1:
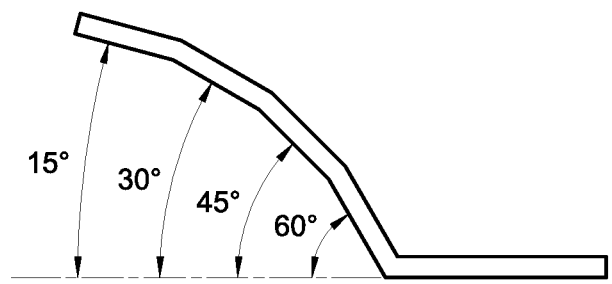
FIG. 1 is the schematic of the slope.
Figure 2:
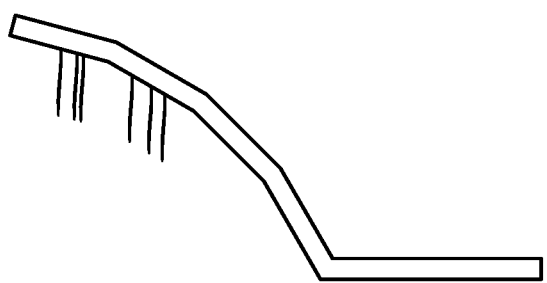
FIG. 2 is the schematic of 3D model entity without supporting structure.
Figure 3:
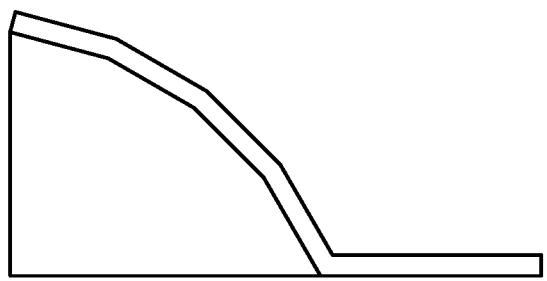
FIG. 3 is the schematic of the 3D model entity with supporting structure.
Figure 4:
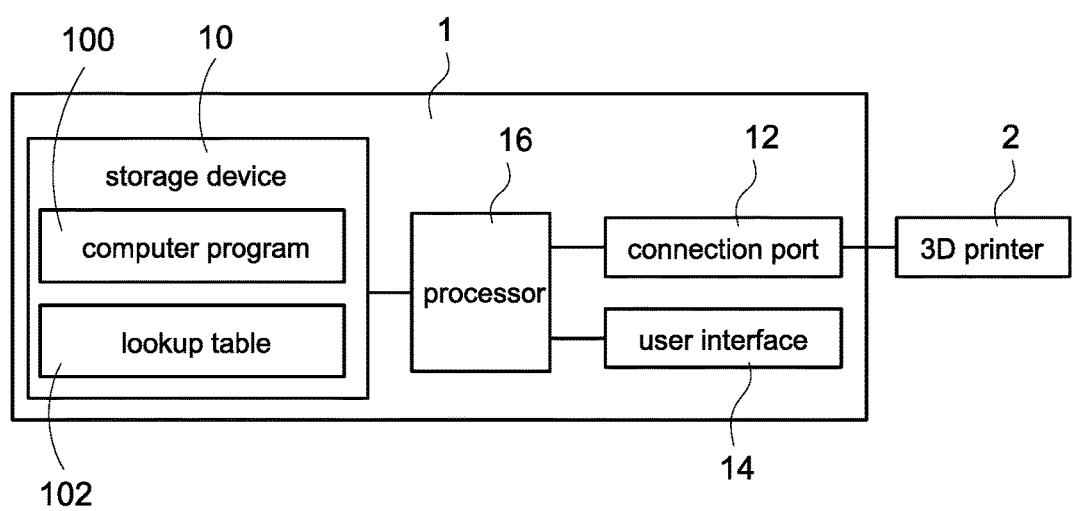
FIG. 4 is the architecture diagram of the printing slicing system for 3D model from the first embodiment of this disclosed example.

Refer to FIG. 4. FIG. 4 is the architecture diagram of the printing slicing system for 3D model from the first embodiment of this disclosed example. FIG. 4 discloses a printing slicing system for 3D model 1 (system 1 as abbreviation), mainly including a storage device 10 for saving data, a connection port 12 electrically connected to a 3D printer 2, an user interface 14 (such as keyboard, mouse, or touch panel) for receiving operations and outputting data, and a processor 16 electrically connected to the above mentioned components to control the system 1. Preferably, the system 1 is a desktop computer, a notebook, a cloud server, or a cellular phone but should not be limited herein.

Preferably, the storage device 10 can further save a computer program 100. The computer program 100 records codes which can be executed by a computer. After the processor 16 executes the computer program 100, the printing slicing method for 3D model mentioned in each of the embodiments of this disclosed example can be realized.

Figure 5:
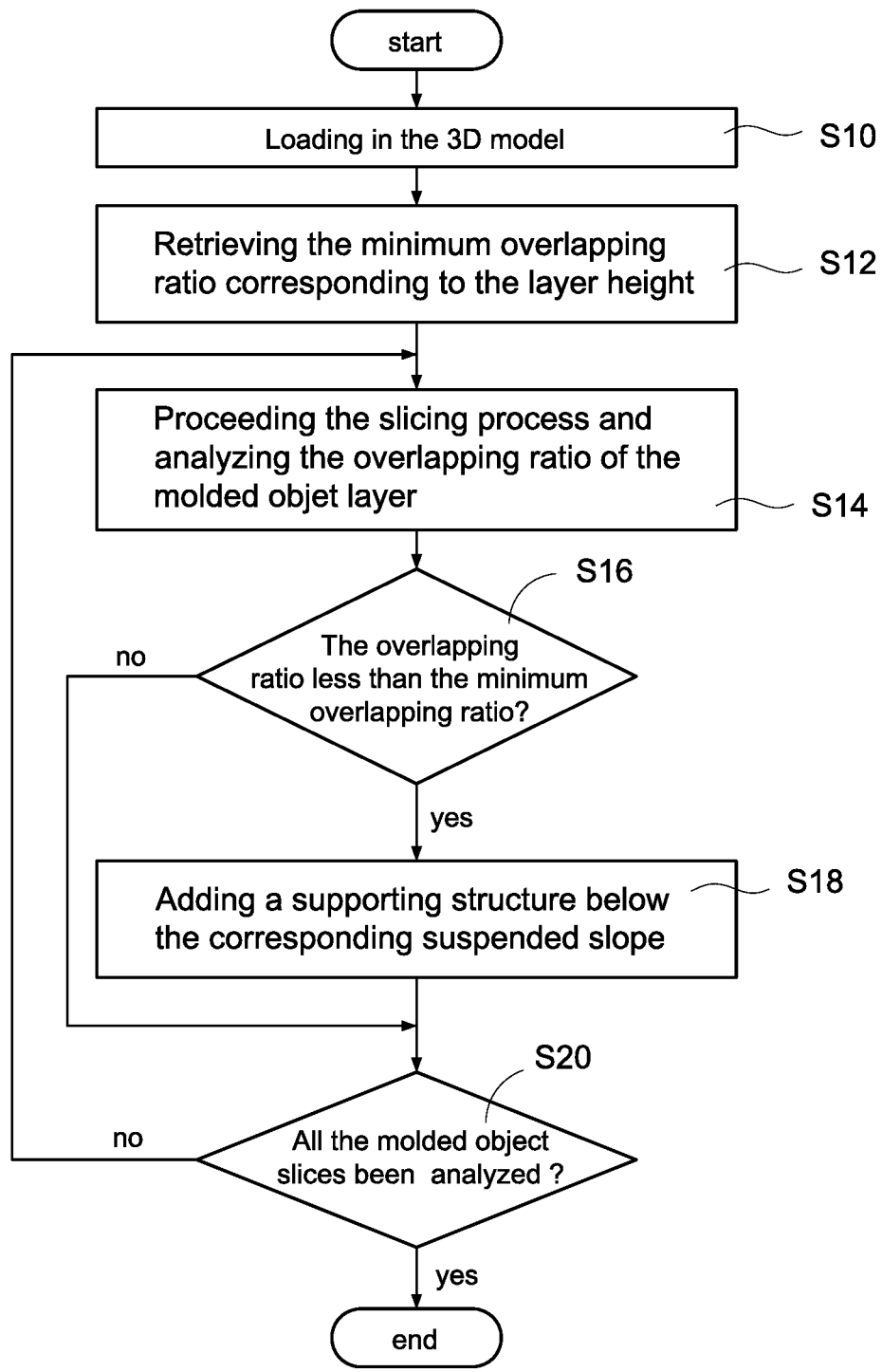
FIG. 5 is the flow chart of the printing slicing method for 3D model from the first embodiment of this disclosed example.

Please continue to refer to FIG. 5 at the same time. FIG. 5 is the flow chart of the printing slicing method for 3D model from the first embodiment of this disclosed example. The printing slicing methods for 3D model from each of the embodiments of this disclosed example are mainly realized by the system 1 as shown in FIG. 4. The printing slicing method for 3D model from the present embodiment includes the following steps.

Step S10: The system 1 loads a 3D model. Specifically, the storage device 10 can further import or save a 3D object file (not shown in the figure), such as STL file, VRML file, PLY file, 3DS file or ZPR file. The processor 16 loads in the 3D model via reading the 3D object file and loads the related data of the 3D model.

Step S12: the system 1 retrieves a minimum overlapping ratio corresponding to a layer height. Specifically, the system 1 retrieves the layer height used in a following slicing process first, and then reads the minimum overlapping ratio corresponding to the layer height from the storage device 10.

In another embodiment of this disclosed example, the layer height can be derived via calculation. Specifically, the system 1 retrieves a height value of the 3D model and a number of slicing used in the slicing process. Next, the system 1 divides the height value of the 3D model to the number of slicing to calculate the layer height, and retrieves the corresponding calculated critical angle of the layer height.

Step 14: according to the layer height, the system 1 proceeds the slicing process to the 3D model to retrieve a plurality of molded object slices, and analyzes an overlapping ratio between the two adjacent molded object slices among the molded object slices in order, wherein the number of the molded object slices are the same as the number of slicing. The two molded object slices are adjacent up and down and forms a suspended slope. Specifically, the molded object slice of the upper layer and the molded object slice of the lower layer are not overlap completely, so that the molded object slice of the upper layer has a suspended part and an overlapped part which overlaps with the molded object slice of the lower part (the part included in the overlap length Lz as shown in FIG. 7).

Furthermore, after the slicing process, the 3D model can be transformed into a slicing model piled up by the molded object slices. Also, in the slicing model, the suspended slope is formed by stepped piling the two molded object layers (as shown in FIG. 7), so as to present a smooth 3D suspended slope of the 3D model. As a result, an inclined angle of each of the suspended slope of the slicing model corresponds separately to an inclined angle of the different 3D suspended slopes of the 3D model.

Figure 7:
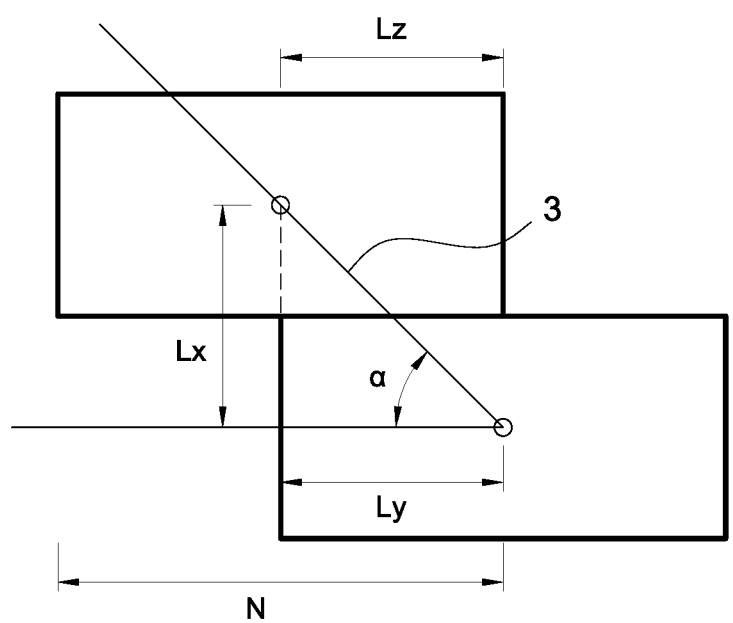
FIG. 7 is the schematic of the first suspended slope of this disclosed example.

Also, the overlapping ratio of the two molded object slices (an overlap length Lz divided by an aperture N as shown in FIG. 7) decreases or increases with the inclined angle of the suspended slope or the corresponding 3D suspended slope. Furthermore, as the inclined angle become smaller, the overlapping ratio become smaller, and vice versa.

The system 1 can select the two molded object slices adjacent up and down among the molded object slices in sequence, and verify whether the selected two molded object slices form the suspended slope. If so, further analyzes the overlapping ratio between the two molded object slices which are adjacent up and down to each other and form the suspended slope.

Step S16: the system 1 determines whether the overlapping ratio of the suspended slope is less than the minimum overlapping ratio. If the overlapping ratio is less than the minimum overlapping ratio, concluding that the suspended slope may have insufficient adhesion area when printing in the future, and executes the step S18; otherwise, it is concluded that the corresponding suspended slope has sufficient adhesion area when printing in the future, and executing the step S20.

Step S18: the system 1 adds in a required supporting structure below the suspended slope formed by the two molded object slices when the overlapping ratio is less than the minimum overlapping ratio. Thereby, the suspended slope can have sufficient adhesion area and will not printing failure. Preferably, the supporting structure includes a plurality of supporting object slices. Also, the layer height of each of the supporting object slices are the same as or different to the layer height of the molded object slice.

Step S20: the system 1 determines whether the analyses of all the molded object slices of the slicing model are complete. If the system 1 determines the complete of analysis, the printing slicing method for 3D model is ended; otherwise the step S14 is executed again.

Figure 6:
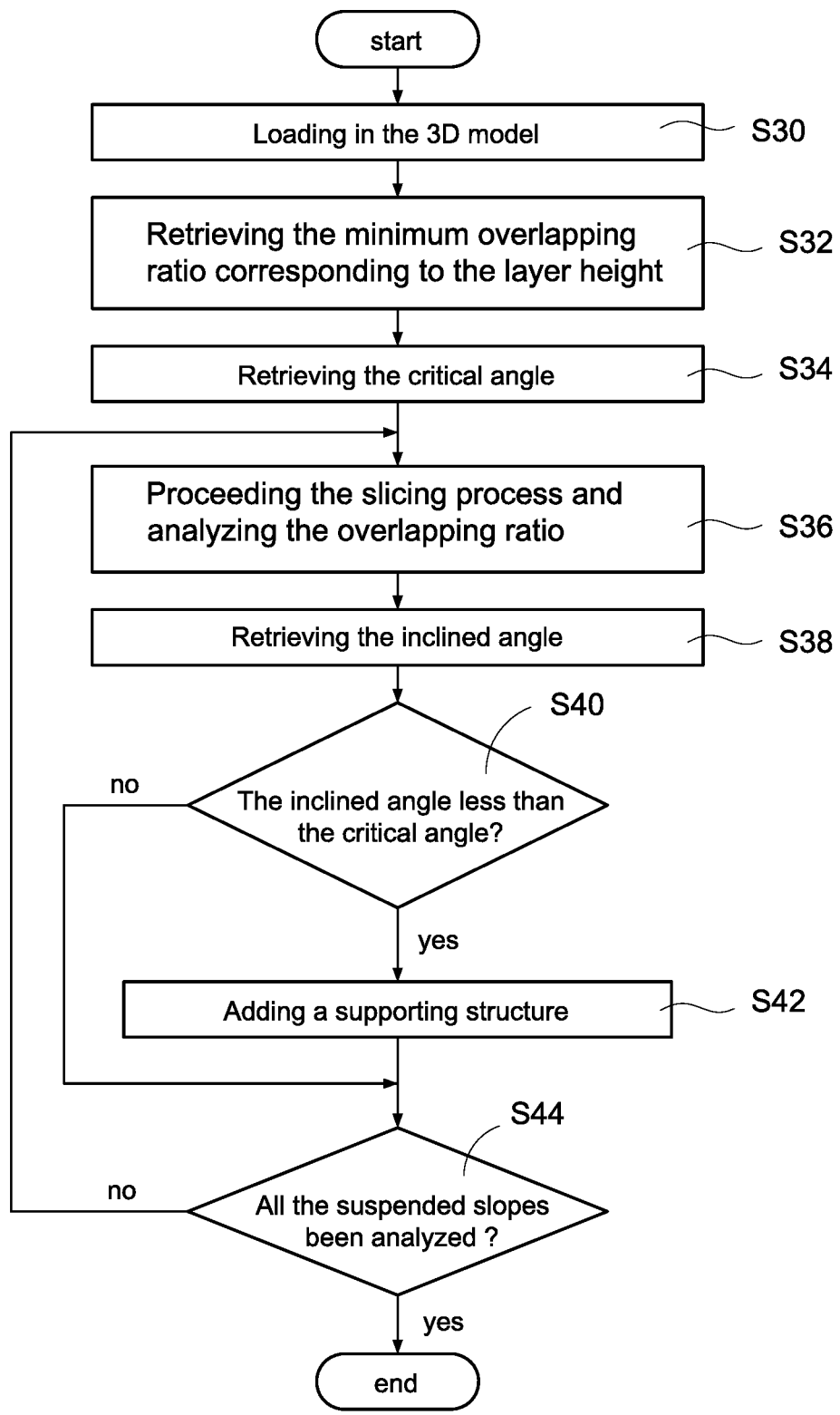
FIG. 6 is the flow chart of the printing slicing method for 3D model from the second embodiment of this disclosed example.

Please continue to refer to FIG. 6. FIG. 6 is the flow chart of the printing slicing method for 3D model from the second embodiment of this disclosed example. The difference between the present embodiment and the first embodiment is: the present embodiment determines adding the supporting structure or not using the inclined angle which is easier to be compared and processed instead of the overlapping ratio, in order to increase the processing efficiency. The printing slicing method for 3D model of the present embodiment includes the following steps.

Step S30: load the 3D model.

Step S32: retrieve the layer height and the minimum overlapping ratio corresponding to the layer height.

Step S34: retrieve the critical angle corresponding to the minimum overlapping ratio, the layer height and the printing aperture of the 3D printer 2, wherein the printing aperture is the width of supplies (such as 0.4 mm or 0.2 mm) squeezed out by the 3D printer 2.

Preferably, the system 1 can accept that the user entering the minimum overlapping ratio, the layer height, the number of slicing or the printing aperture via the user interface 14. The system 1 can read the minimum overlapping ratio, the number of slicing or the printing aperture from the storage device 10 which have been pre-saved; or receiving the minimum overlapping ratio, the layer height, the number of slicing or the printing aperture from an external device (such as 3D printer 2), and should not be limited herein.

Preferably, the storage device 10 further saves a lookup table 102. The lookup table 102 records a corresponding relation between the minimum overlapping ratio, the plurality of the layer heights, the printing aperture and the critical angle. The system 1 can proceed a table look-up on lookup table 102 according to the retrieved layer height and the printing aperture, so as to retrieve the critical angle (as will be illustrated in details later).

Although in the present embodiment, the system 1 retrieves the critical angle via referring to the lookup table 102, but it should not be limited herein. From another embodiment of this disclosed example, the system 1 can also retrieve the critical angle via real time computations (as will be illustrated in details later).

Step S36: the slicing process is executed, analyzing the overlapping ratio between the two molded object slices which are adjacent up and down to each other and form the suspended slope.

Step S38: retrieve the inclined angle of the suspended slope formed by the two molded object slices. Preferably, the system 1 calculates the inclined angle of the suspended slope according to the overlapping ratio, the printing aperture and the layer height (as will be illustrated in details later).

From another embodiment of this disclosed example, the system 1 can first proceed a verification to the molded object slices of the slicing model, so as to verify the suspended slope of the suspension formed by the two molded object slices, such as selecting the two molded object layers in sequence and analyzing separately to see whether the selected two molded object layers forms a slope or not and whether the formed slope is suspended or not; or, according to an attached information from the 3D object file to retrieve the position of each of the 3D suspended slopes at first, and then determining the position of the corresponding suspended slope according to the above, and then analyzing the inclined angle of the suspended slope (such as taking the inclined angle of the corresponding 3D suspended slope as the inclined angle of the suspended slope).

In another embodiment of the present disclosed example, the system 1 can analyze the inclined angle of the suspended slope according to the 3D model. Specifically, all the 3D suspended slopes of the 3D model are designed according to the inclined angle presumed by the user, and being saved in the form of the 3D object file. Therefore the attached information of the 3D object file can include all the inclined angles of the 3D suspended slopes.

Step S40: the system 1 determines whether the inclined angle of the suspended slope is less than the critical angle. If the inclined angle is less than the critical angle, executing the step S42; otherwise executing the step S44.

Step S42: the system 1 adds in the supporting structure below the corresponding suspended slope.

Step S44: the system 1 determines whether the analyses of all the suspended slopes are complete. If the system 1 determines the complete of analyses, ending the printing slicing method for 3D model; otherwise, executing the step S36 again.

Refer to FIG. 7. FIG. 7 is the schematic of the first suspended slope of this disclosed example, which illustrating how to derive the following formula 1 used in the calculation of the critical angle.

$$\text{critical angle } \alpha = \cot^{-1}(1-k) * \frac{N}{Lx}, 0 < k < 1 \qquad \text{(formula 1)}$$

In the formula, k is the minimum overlapping ratio between the two molded object slices adjacent up and down; N is the printing aperture; Lx is the layer height.

First, the 3D suspended slope 3 of the 3D model can be transformed into the suspended slope piled up by the two molded object slices which are adjacent up and down to each other and are suspended on the upper layer after the slicing process (the molded object slice is the minimum range can be printed by the 3D printer according to the current setting). That is to say, the number of slicing of the 3D suspended slope 3 via the slicing process is 2 (layers).

Next, we can assume that the horizontal width of each of the molded object slices is the printing aperture N; each of the height of the molded object slices is the layer height Lx;

and can further assume that the horizontal overlap length of the two molded object slices is Lz; the horizontal distances between the central points of the two molded object slices is Ly, and Ly=N−Lz can be deduced. Next, the formula 2 can be derived by the following calculation:

$$\cot\alpha = \frac{Ly}{Lx} = \frac{N-Lz}{Lx} \quad \text{(formula 2)}$$

$$\Rightarrow \alpha = \cot^{-1}\frac{N-Lz}{Lx}。$$

It is worth mention that when it come to the printing, the sufficiency of the adhesion area of supplies mainly depends on whether the overlapping ratio between the overlap length Lz of the two molded object slices and the horizontal width (i.e. the printing aperture N) of the molded object slice is higher enough or not. In other words, when the overlapping ratio becomes higher (the length Lz becomes longer), the critical angle α becomes larger, the adhesion area of supplies becomes larger, thus not easy to be printing failure; when the overlapping ratio becomes lower (the length Lz becomes shorter), the critical angle α becomes smaller, the adhesion area of supplies becomes smaller comparatively, thus easier to be printing failure.

Furthermore, under the condition without the supporting structure, the minimum overlapping ratio for the supplies to have sufficient and least adhesion area (i.e. the lowest limit of the overlap length Lz) is determined by the material of supplies; the stronger the stickiness, the lower the minimum overlapping ratio, and vice versa.

We can assume that the minimum overlapping ratio is k, and the formula 3 according to the following calculations can be deduced:

$$k = \frac{Lz}{N}, 0 < k < 1 \quad \text{(formula 3)}$$

$$\Rightarrow Lz = k*N, 0 < k < 1。$$

Next, putting the formula 3 to the formula 2, then the formula 1 can be derived:

$$\alpha = \cot^{-1}(1-k)*\frac{N}{Lx}, 0 < k < 1。 \quad \text{(formula 1)}$$

Preferably, when the minimum overlapping ratio k=1/2 (the overlap length of the two molded object slices is at least larger than one half of the printing aperture N, or the suspended length of the molded object slice on the upper layer is at least smaller than one half of the printing aperture N), the supplies of most materials can have sufficient adhesion area while printing, such that the squeezed out supplies will not easy to be printing failure due to the insufficient adhesion area. In other words, the calculated critical angle α according to k=1/2 can be adapted to most of printing conditions.

Next, it is illustrated how the system 1, according to the retrieved layer height and the printing aperture, proceeds a table look up on the lookup table 102.

TABLE 1

| Critical Angle (α) | Printing aperture (N) | | |
|---|---|---|---|
| | 0.2 mm | 0.3 mm | 0.4 mm |
| Layer Height (Lx) 0.4 mm | | | 63.4 (degrees) |
| 0.3 mm | | 63.4 (degrees) | 56.3 (degrees) |
| 0.2 mm | 63.4 (degrees) | 53.1 (degrees) | 45.0 (degrees) |
| 0.1 mm | 45 (degrees) | 33.7 (degrees) | 26.6 (degrees) |

Table 1 is an embodiment of the lookup table 102 in which, as an example, illustrating how to refer to a table. A plurality of the critical angles shown in table 1 is, according to the calculation of the minimum overlapping ratio 1/2, the different layer heights, and the different printing aperture respectively in advance, and recording in the lookup table 102, so that the system 1 can rapidly retrieve the corresponding critical angle without calculation in later processes.

For example, if the printing aperture is 0.3 mm, the layer height is 0.2 mm, then the system 1 can rapidly conclude that the critical angle is 53.1 degrees. If the printed aperture is 0.4 mm, the layer height is 0.1 mm, the system 1 can rapidly conclude that the critical angle is 26.6 degrees and so forth.

Although in the present embodiment, the illustration is proceeded only by the lookup table 102 with the minimum ratio 1/2 but should not be limited with such examples. In another embodiment of this disclosed example, the storage device 10 can save a plurality of the lookup tables 102, and each of the lookup tables 102 corresponds respectively to the different minimum overlapping ratio (such as the three set of lookup tables 102 in which the corresponding minimum overlapping ratios are 1/2, 2/3, and 3/4 respectively). The system 1 can automatically choose the suitable lookup table 102 to proceed a table look-up according to the user requirement.

It is worth mention that, although in the above specification, the formula 1 and the lookup table 102 is used to calculate the critical angle, but should not be limited herein. The above mentioned formula 1 and the lookup table 102 can also apply to the calculation of the inclined angle.

Taking the calculation which uses the above mentioned formula 1 as an example, the critical angle α can be replaced by the inclined angle β, and the minimum overlapping ratio can be replace by the overlapping ratio R, thus the following formula 2 can be derived:

$$\text{inclined angle } \beta = \cot^{-1}(1-R)*\frac{N}{Lx}, 0 < R < 1; \quad \text{(formula 2)}$$

wherein R is the overlapping ratio between the two molded object slices which are adjacent up and down; N is the printing aperture; Lx is the layer height.

Thereby, in the step S38, the system 1 can calculate the corresponding inclined angle according to the retrieved overlapping ratio, the printing aperture and the layer height.

Taking the calculation which uses the lookup table 102 as an example, the storage device 10 can save a plurality of the lookup tables 102, each of the lookup tables 102 corresponding respectively to the different overlapping ratios, and each of the lookup tables 102 recording the corresponding relations between the plurality of the layer heights, the printing apertures and the critical angles as in the table 1. The system 1 can choose the corresponding lookup table 102 according to the achieved overlapping ratio, and proceeds a table look-up from the selected lookup table 102 according to the achieved layer height and the printing aperture.

Figure 8:
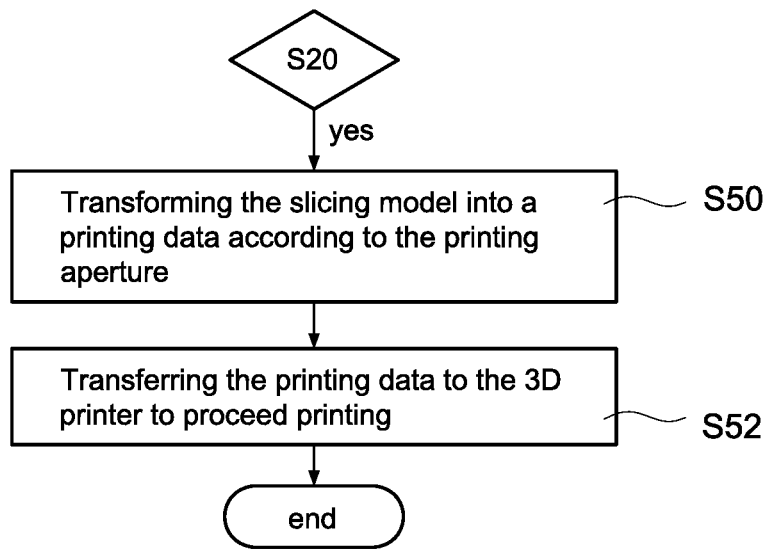
FIG. 8 is part of the flow chart of the printing slicing method for 3D model from the third embodiment of this disclosed example.

Please continue to refer to FIG. 8. FIG. 8 is part of the flow chart of the printing slicing method for 3D model from the third embodiment of this disclosed example. The difference between the present embodiment and the first embodiment is: the printing slicing method for 3D model in the present embodiment further including the following steps after the step S20.

Step S50: according to the printing aperture of the 3D printer 2, i.e. the first printing aperture, the system 1 transforms the molded object slices into a printing data, i.e. the first printing data. Preferably, the printing data is composed by a plurality of printing control commands (such as a command for pointing to the moving position of the nozzle of the 3D printer 2), such as G-code. Also, the system 1 can further transform the supporting object slices into another printing data (i.e. the second printing data) according to another printing aperture (i.e. the second printing aperture) of the 3D printer 2, wherein the first printing aperture and the second printing aperture can have the same or different printing apertures.

Step S52: the system 1 transfers the printing data to the 3D printer 2 to proceed printing. Specifically, the system 1 transfers the first printing data and the second printing data to the 3D printer. The 3D printer 2 proceeds printing to print out a 3D model entity with add-on supporting structures according to the received printing data.

Preferably, the 3D printer 2 uses supplies with different materials to respectively print the molded object slices and the supporting object slices, such as using a first material supplies (such as high stickiness or sparingly soluble materials) to print the molded object slices, and use a second material supplies (such as water-soluble or other soluble materials) to print the supporting object slices. Thereby, the 3D model entity produced by this disclosed example can effectively and rapidly removing the supporting structure via soaking in solvents or stripping by external forces after finishing printing.

Preferably, the 3D printer 2 includes a plurality of nozzles, and the nozzles can proceed printing simultaneously. In the case of double nozzles, the first nozzle can print the molded object slice according to the first printing data. Also, the second nozzle can simultaneously print the supporting object slice according to the second printing data. The materials of printing supplies used by the nozzles can be the same or different. Thereby, this disclosed example can increase the printing speed effectively. Also, supplies with different materials can be used in this disclosed example to proceed printing simultaneously, so as to produce the 3D model entity having composite materials.

Figure 9:
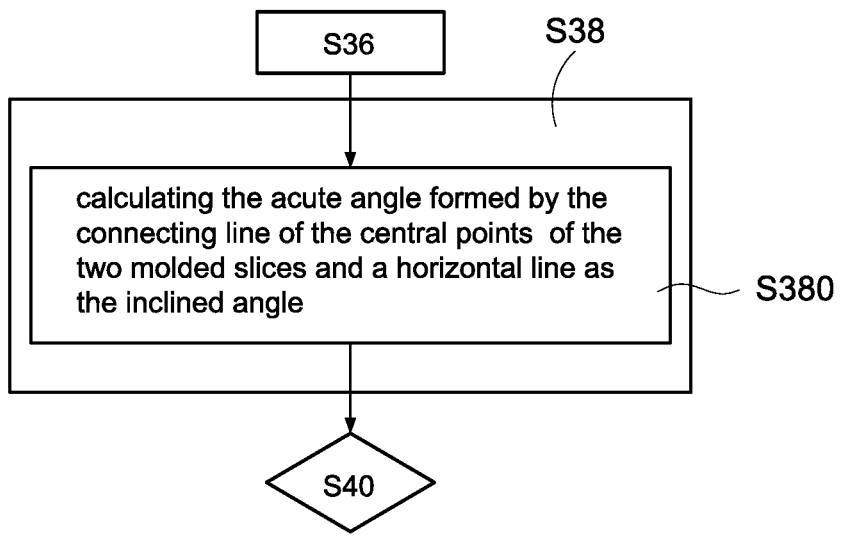
FIG. 9 is part of the flow chart of the printing slicing method for 3D model from the fourth embodiment of this disclosed example.

Please continue to refer to FIG. 9. FIG. 9 is part of the flow chart of the printing slicing method for 3D model from the fourth embodiment of this disclosed example. The difference between the present embodiment and the second embodiment is, the step S38 of the printing slicing method for 3D model in the present embodiment further includes step S380.

Step 380: the system 1 calculates the acute angle formed by the connecting line of the central points of the two molded object slices according to the overlapping ratio, and the acute angle acts as the inclined angle.

Figure 10:
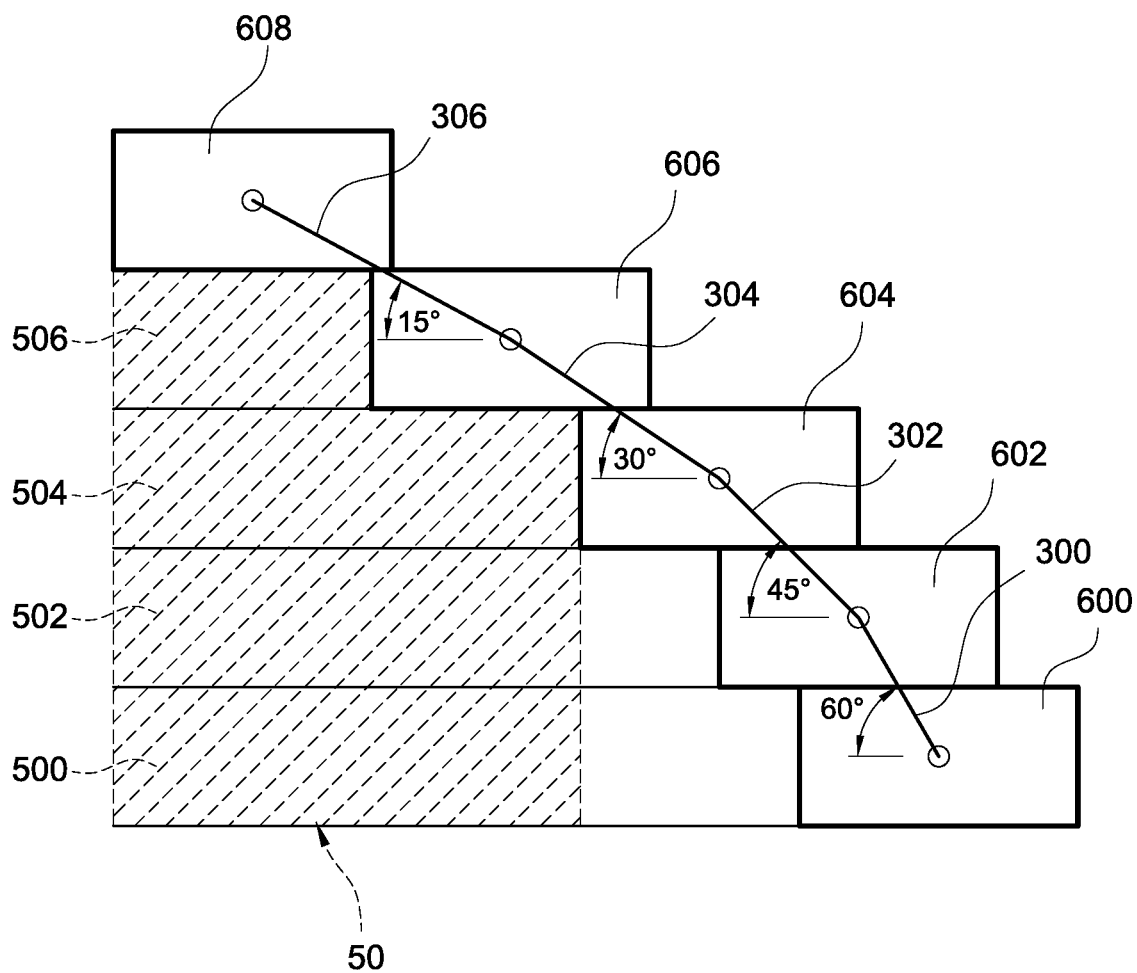
FIG. 10 is the schematic of the second suspended slope of this disclosed example.
Figure 11:
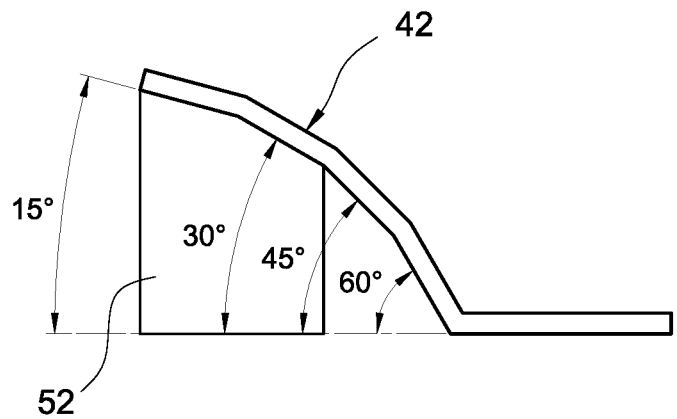
FIG. 11 is the schematic of the 3D model entity after adding the supporting structure.
Figure 12:
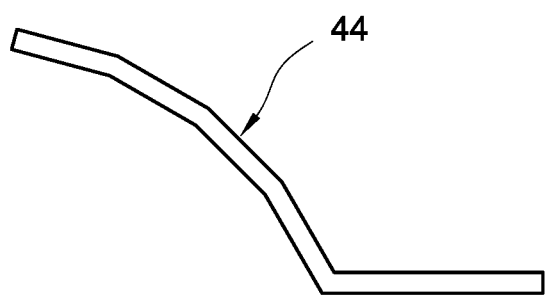
FIG. 12 is the schematic of the 3D model entity after removing a supporting structure.

Please continue to refer to FIG. 10, FIG. 11 and FIG. 12. FIG. 10 is the schematic of the second suspended slope of this disclosed example. FIG. 11 is the schematic of the 3D model entity after adding a supporting structure. FIG. 12 is the schematic of the 3D model after removing the supporting structure, so as to illustrate as an example, how to automatically add the supporting structure to the 3D model entity. In the present embodiment, the critical angle of 45 degrees will be illustrated as an example.

Please refer to FIG. 10, in the present embodiment, a 3D model 40 can be transformed into five molded object slices 600-608 via the slicing process, and the five molded object slices 600-608 comprise four suspended slopes 300-306. The inclined angles of the suspended slopes 300-306 is 60 degrees, 45 degrees, 30 degrees, and 15 degrees respectively.

Next, the system 1 can determines that the inclined angle (60 degrees) of a first suspended slope 300 and the inclined angle (45 degrees) of a second suspended slope 302 is not less than the critical angle (45 degrees), thus the adding of supporting structures is not necessary. Also, the system 1 determines that the inclined angle (30 degrees) of a third suspended slope 304 and the inclined angle (15 degrees) of a fourth suspended slope 306 is less than the critical angle, thus the adding of supporting structures is necessary.

After the determinations, the system 1 add in a supporting structure 50 to the molded object slice 606 corresponding to the third suspended slope 304 and the fourth suspended slope 306 and (add in a supporting structure 50) below a suspended part of the molded object slice 608 (slash lines as shown in FIG. 10). Preferably, the supporting structure 50 includes four supporting object slices 500-506, and the layer heights of the supporting object slices 500-506 are the same as that of the molded object slices 600-608. The height of the supporting structure 50 (i.e. the number of slices of the supporting object slices 500-506) is mainly determined according to the suspended heights of the suspended slopes 300-306.

Next, the system 1 proceeds the molded object slices 600-608 and the supporting object slices 500-506 and transfers them to the 3D printer 2 to be printed out, so as to produce a 3D model entity 42 in which a supporting structure entity 52 has been added on as shown in FIG. 11.

It is worth mentioned that, during the printing process, the molded object slices 600-608 and the supporting structure slices 500-506 at the same layer or at the same height can be printed simultaneously.

For example, the 3D printer 2 will simultaneously print the molded object slice 600 and the supporting object slice 500, then the printing of the molded object slice 602 and the supporting structure slice 502 simultaneously; printing the molded object slice 604 and the supporting object slice 504 simultaneously; printing the molded object slice 606 and the supporting structure slice 506 simultaneously; finally printing the molded object slice 608. Also, when it comes to the printing of the molded object slice 606, 608, since the supporting structure slice 504, 506 which have been printed completely, can provide supporting timely, the printing of squeezed out printing supplies by the 3D printer 2 will not fail due to the insufficient adhesion area thereon.

Finally, the user can remove the supporting structure entity 52 on the 3D model entity 42 manually or via machine, and obtaining a successfully printed 3D model entity 44 without the supporting structure entity 52 as shown in FIG. 12.

Figure 13:
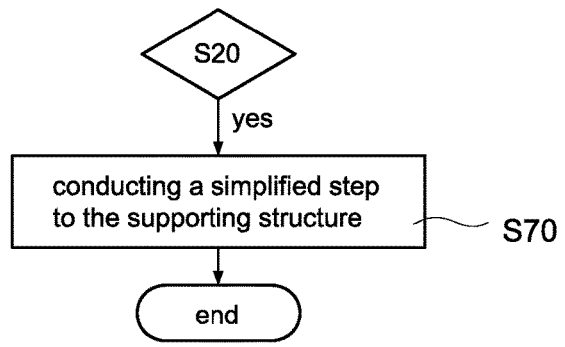
FIG. 13 is part of the flow chart of the printing slicing method for 3D model from the fifth embodiment of this disclosed example.

Please continue to refer to FIG. 13. FIG. 13 is part of the flow chart of the printing slicing method for 3D model from the fifth embodiment of this disclosed example. The difference between this disclosed example and the first embodiment is, after the printing slicing method for the 3D model of this disclosed example determines the completeness of analyses to all of the molded object slices of the slicing model (step S20, yes), the step S70 can be further executed: the system 1 conduct a simplified step to the added supporting structure.

Specifically, the system 1 can proceed analyses one by one to all the added supporting structures, so as to determine separately whether the adjacent supporting structures can be deleted or combined or not. If the system 1 determines the existences of the supporting structures which can be deleted or combined, then executing a deleting process or a combining process.

Preferably, the simplified step is to combine the supporting structures adjacent to each other into a shared supporting structure, wherein the sum of the overlapping ratio between the shared supporting structure and the supported molded object slice and the overlapping ratio between the supported molded object slice and other molded object slices is not less than the minimum overlapping ratio.

This disclosed example can effectively reduce the number of supporting structures via executing simplified steps to supporting structures, and can reduce the usage amount of supplies.

Figure 14:
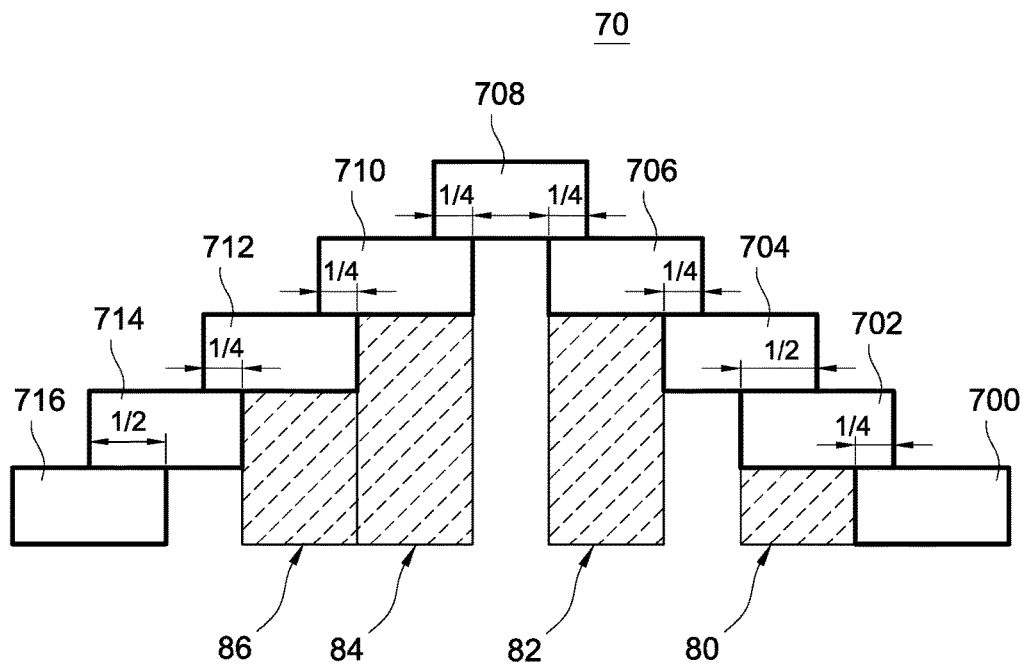
FIG. 14 is the first schematic of the simplified supporting structure of this disclosed example.
Figure 15:
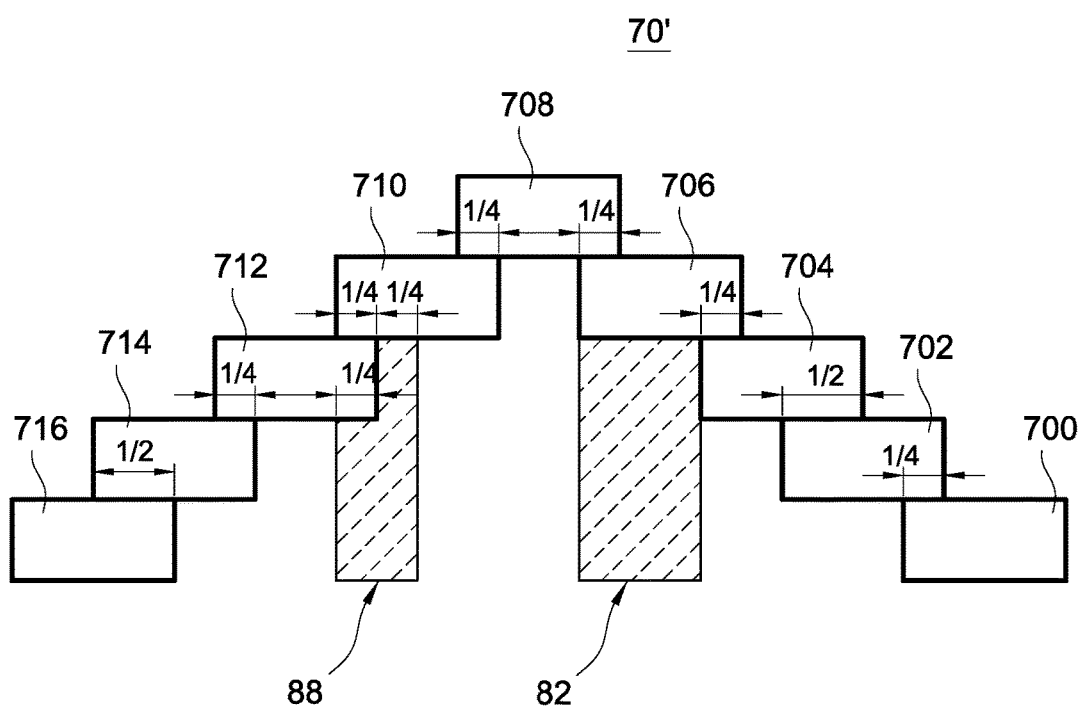
FIG. 15 is the second schematic of the simplified supporting structure of this disclosed example.

Please continue to refer to FIG. 14 and FIG. 15 simultaneously. FIG. 14 is the first schematic of the simplified supporting structure of this disclosed example. FIG. 15 is the second schematic of the simplified supporting structure of this disclosed example.

As shown in FIG. 14, in the present example, a minimum overlapping ratio is 1/2, and a 3D model 70 can be transformed into nine molded object slices 700-716 after the slicing process, wherein the nine molded object slices 700-716 are adjacent and overlap to each other.

Next, the system 1 determines that the overlapping ratio (1/4) between the molded object slice 700 and the molded object slice 702 is less than the minimum overlapping ratio, thus the adding of a supporting structure 80 is necessary. Also, the system 1 determines that the overlapping ratio (1/2) between the molded object slice 702 and the molded object slice 704 is not less than the minimum overlapping ratio, thus the adding of a supporting structure is not necessary. Also, the system 1 determines that the overlapping ratio (1/4) between the molded object slice 704 and the molded object slice 706 is less than the minimum overlapping ratio, thus the adding of a supporting structure 82 is necessary.

Also, the system 1 determines that the sum (1/2) of the overlapping ratio (1/4) between the molded object slice 708 and the molded object slice 706 and the overlapping ratio (1/4) between the molded object slice 708 and the molded object slice 710 is not less than the minimum overlapping ratio, thus the adding of a supporting structure is not necessary.

Also, the system 1 determines that the overlapping ratio (1/4) between the molded object slice 710 and the molded object slice 712 is less than the minimum ratio, and is necessary to add in a supporting structure 84. Also, the system 1 determines that the overlapping ratio (1/4) between the molded object slice 712 and the molded object slice 714 is less than the minimum overlapping ratio, thus the adding of a supporting structure 86 is necessary. Also, the system 1 determines that the overlapping ratio (1/2) between the molded object slice 714 and the molded object slice 716 is not less than the minimum overlapping ratio, thus the adding of a supporting structure is not necessary.

Next, as shown in FIG. 15, the system 1 executes the simplified step to the added on supporting structures 80-86, so as to obtain 3D model 70' in which the supporting structures has been simplified.

Specifically, if the number of supporting object slices of the supporting structures is not much, the printing of the 3D model entity will not necessarily fail even if the supporting structures been removed. Therefore, the system 1 can delete the supporting structure for supporting object slices when the number of slices are lower than a critical number of slices (such as 2 slices), so as to save the usage amount of supplies.

Also, the system 1 can combine a plurality of adjacent supporting structures (such as combining the supporting structure 84 and the supporting structure 86 into a shared supporting structure 88) to save the usage amount of supplies.

Preferably, after executing the combining process to the supporting structures, the sum of the overlapping ratio between the shared supporting structure and the supported molded object slice and the overlapping ratio between the supported molded object slice and other molded object slices is not less than the minimum overlapping ratio.

For example, the sum (1/2) of the overlapping ratio (1/4) between the shared supporting structure 88 and the molded object slice 710 and the overlapping ratio (1/4) between the molded object slice 710 and the molded object slice 712 is not less than the minimum overlapping ratio. The sum (1/2) of the overlapping ratio (1/4) between the shared supporting structure 88 and the molded object slice 712 and the overlapping ratio (1/4) between the molded object slice 712 and the molded object slice 714 is not less than the minimum overlapping ratio.

This disclosed example can effectively prevent the suspended part of a printed 3D model entity from a deformation because of the adhesion area thereon is too small, and can also avoid setting supporting structures on parts for which the supporting structures are not necessary, so as to effectively save printing time and the usage amount of supplies.

The foregoing descriptions of embodiments of the present disclosed example have been presented only for purposes of illustration and description. They are not intended to be exhaustive or to limit the present disclosed example to the forms disclosed. Accordingly, many modifications and variations will be apparent to practitioners skilled in the art. Additionally, the above disclosure is not intended to limit the present disclosed example. The scope of the present disclosed example is defined by the appended claims.

What is claimed is:

1. A method of automatically adding supporting structure to 3D model, comprising:
   a) retrieving a layer height and a minimum overlapping ratio corresponding to the layer height;
   b) executing a slicing process to retrieve a plurality of molded object slices according to the layer height, and analyzing respectively an overlapping ratio between at least two of the molded object slices among the molded object slices adjacent up and down and forming a suspended slope;
   c) adding a supporting structure below the corresponding suspended slope when determining that the overlapping ratio is less than the minimum overlapping ratio;
   d) transforming the plurality of molded object slices and the plurality of supporting object slices incorporated in the supporting structure into printing data; and
   e) printing the plurality of molded object slices for materializing according to the printing data at a 3D printer and printing the plurality of supporting object slices for materializing according to the printing data during printing the plurality of molded object slices.

2. The method of automatically adding supporting structure to 3D model as claim 1, wherein the step a) is to divide a height value of the 3D model to a number of slicing to retrieve the layer height, wherein the number of the molded object slices and the number of slicing are the same.

3. The method of automatically adding supporting structure to 3D model as claim 1, wherein the step a) includes step a1): retrieving a critical angle corresponding to the minimum overlapping ratio, the layer height and a printing aperture of a 3D printer; step b1) is included after the step b): retrieving an inclined angle of the suspended slope according to the overlapping ratio; the step c) is to determine whether the overlapping ratio is less than the minimum overlapping ratio according to the inclined angle is less than the critical angle or not.

4. The method of automatically adding supporting structure to 3D model as claim 3, wherein the step a1) retrieves the critical angle according to a lookup table, wherein the lookup table records corresponding relations between the minimum overlapping ratio, a plurality of the layer heights, the printing aperture and the critical angle.

5. The method of automatically adding supporting structure to 3D model as claim 3, wherein the critical angle is $$\cot^{-1}(1-k) * \frac{N}{Lx}, 0 < k < 1,$$

wherein k is the minimum overlapping ratio; N is the printing aperture; Lx is the layer height.

6. The method of automatically adding supporting structure to 3D model as claim 3, wherein the step b1) includes step b11): calculating the acute angle formed by a connecting line of the central points of the two molded object slices and a horizontal line according to the overlapping ratio, and the acute angle acts as the inclined angle.

7. The method of automatically adding supporting structure to 3D model as claim 6, wherein the step c) is to add the plurality of supporting object slices incorporated in the supporting structure to a place below the suspended part of the upper layer of the molded object slice.

8. The method of automatically adding supporting structure to 3D model as claim 1, wherein the minimum overlapping ratio is 1/2.

9. The method of automatically adding supporting structure to 3D model as claim 1, wherein the step d) is configured to transform the plurality of molded object slices into a first printing data according to a printing aperture of the 3D printer, and transform the plurality of supporting object slices into a second printing data, and send the first printing data and the second printing data to the 3D printer to proceed printing.

10. The method of automatically adding supporting structure to 3D model as claim 9, wherein the step e) is, according to the first printing data, controlling a first nozzle of the 3D printer to use a first material supply to proceed printing, and according to the second printing data controlling a second nozzle of the 3D printer to use a second material supply to print the plurality of supporting object slices.

11. The method of automatically adding a supporting structure to a 3D model as claim 1, further comprising step f): proceeding a simplified step to the added supporting structures adjacent to each other before the step d).

12. The method of automatically adding supporting structure to 3D model as claim 11, wherein the simplified step is to combine the supporting structures adjacent to each other into a shared supporting structure, wherein the sum of the overlapping ratio between the shared supporting structure and the supported molded object slice and the overlapping ratio between the supported molded object slice and other molded object slices is not less than the minimum overlapping ratio.

* * * * *